United States Patent
Despotopoulou et al.

(10) Patent No.: US 10,358,559 B2
(45) Date of Patent: *Jul. 23, 2019

(54) COLORED ORGANIC PEROXIDE COMPOSITIONS

(71) Applicant: Arkema Inc., King of Prussia, PA (US)

(72) Inventors: Marina Despotopoulou, Havertown, PA (US); Scot A. Swan, Norristown, PA (US); Leonard H. Palys, Downingtown, PA (US); Joseph M. Brennan, Swarthmore, PA (US); Michael B. Abrams, Bala Cynwyd, PA (US); Scott J. Schwartz, Princeton Junction, NJ (US)

(73) Assignee: Arkema Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/559,847

(22) PCT Filed: Mar. 10, 2016

(86) PCT No.: PCT/US2016/021654
§ 371 (c)(1),
(2) Date: Sep. 20, 2017

(87) PCT Pub. No.: WO2016/153791
PCT Pub. Date: Sep. 29, 2016

(65) Prior Publication Data
US 2018/0079908 A1 Mar. 22, 2018

Related U.S. Application Data

(60) Provisional application No. 62/137,885, filed on Mar. 25, 2015.

(51) Int. Cl.
| | |
|---|---|
| *C08F 4/32* | (2006.01) |
| *C09B 67/44* | (2006.01) |
| *C08K 5/14* | (2006.01) |
| *C08K 5/00* | (2006.01) |
| *C08K 5/05* | (2006.01) |

(52) U.S. Cl.
CPC ............ *C09B 67/0083* (2013.01); *C08F 4/32* (2013.01); *C08K 5/0041* (2013.01); *C08K 5/05* (2013.01); *C08K 5/14* (2013.01)

(58) Field of Classification Search
CPC .......... C08K 5/14; C08K 5/0041; C08K 5/05; C09B 67/0071; C09B 57/10; C09B 67/0082; C09B 67/0097; C08L 2666/70
See application file for complete search history.

(56) References Cited

U.S. PATENT DOCUMENTS

| | | | |
|---|---|---|---|
| 3,181,991 A | 5/1965 | Leveskis | |
| 3,182,026 A * | 5/1965 | Leveskis | C08F 4/32 502/160 |

(Continued)

FOREIGN PATENT DOCUMENTS

| | | |
|---|---|---|
| JP | 2-274057 | 3/1982 |
| WO | WO 2014/133853 A1 | 9/2014 |

*Primary Examiner* — Eisa B Elhilo
(74) *Attorney, Agent, or Firm* — Lynn B. Morreale (57) ABSTRACT

Stable organic peroxide compositions include at least one organic peroxide (e.g., tert-butyl hydroperoxide), at least one dye (e.g., an FD&C dye), and at least one alcohol (e.g., propylene glycol, tert-butanol, and/or glycerin).

15 Claims, 4 Drawing Sheets

Color Stable Blue t-butyl Hydroperoxide Solution of the Invention (56) References Cited

U.S. PATENT DOCUMENTS

| | | | |
|---|---|---|---|
| 3,806,477 A * | 4/1974 | Jasper et al. | C08F 4/32 |
| | | | 524/40 |
| 3,922,173 A | 11/1975 | Misak | |
| 5,234,711 A | 8/1993 | Kamen et al. | |
| 5,447,199 A | 9/1995 | Dawson et al. | |
| 5,486,550 A | 1/1996 | Lubas | |
| 5,880,181 A * | 3/1999 | Torenbeek | C08F 299/04 |
| | | | 523/506 |
| 8,383,557 B2 | 2/2013 | Huang et al. | |
| 2003/0027903 A1 | 2/2003 | Nwoko et al. | |
| 2003/0235549 A1 * | 12/2003 | Singh | A61C 19/063 |
| | | | 424/70.13 |
| 2004/0062723 A1 | 4/2004 | Zaidel et al. | |
| 2006/0289160 A1 | 12/2006 | Van Batenburg et al. | |
| 2008/0202758 A1 | 8/2008 | Delorey et al. | |
| 2011/0247821 A1 | 10/2011 | Thompson et al. | |
| 2013/0324445 A1 | 12/2013 | Quintero et al. | |
| 2014/0178324 A1 | 6/2014 | Martinez-Castro et al. | |

\* cited by examiner

Figure 1

Color Stable Blue t-butyl Hydroperoxide Solution of the Invention

Figure 2

Color Stable Blue t-butyl Hydroperoxide Solution of the Invention

Figure 3

Blue Colored t-Butyl Hydroperoxide Solution (Comparative)

Figure 4

Unstable Blue Colored t-Butyl Hydroperoxide Solution (Comparative)

Figure 5

Color Stable Blue t-butyl Hydroperoxide Solution of the Invention

Figure 6

Color Stable Blue t-butyl Hydroperoxide Solution of the Invention

Figure 7

Color Stable Red t-butyl Hydroperoxide Solution of the Invention

Figure 8

Color Stable Red t-butyl Hydroperoxide Solution of the Invention

COLORED ORGANIC PEROXIDE COMPOSITIONS

CROSS-REFERENCE TO RELATED APPLICATIONS

This application is a national stage application under 35 U.S.C. § 371 of PCT/US2016/021654 filed Mar. 10, 2016, which claims benefit to U.S. patent application Ser. No. 62/137,885, filed Mar. 25, 2015.

FIELD OF THE INVENTION

The present invention relates to colored organic peroxide compositions and methods for using the compositions.

BACKGROUND OF THE INVENTION

Organic peroxides have a wide variety of commercial uses. Organic peroxide compositions have previously included colored components; for example, U.S. Pat. No. 3,181,991 is directed to pigmented peroxide compositions; and U.S. Publication No. 2003/0027903 is directed to colored peroxide and polyester formulations. The inclusion of a colored dye in an organic peroxide composition makes the composition more easily identifiable (e.g., to differentiate the composition from other commercially available compositions). The added color also provides a visual aid to help the operator confirm an adequate flow and uniform mixing of the composition with other components. It has been difficult to develop colored organic peroxide compositions that remain color-stable because dyes often fade significantly or precipitate out of solution after a short period of time. Thus, there remains a need for colored organic peroxide compositions that are color-stable for a longer period of time.

SUMMARY OF THE INVENTION

The present invention provides stable organic peroxide compositions that include at least one dye, for example, an FD&C dye (e.g., FD&C Blue #1 and/or FD&C Red #40 and/or FD&C Red #3 and/or FD&C Yellow #6). In one aspect of the invention, colored organic peroxide compositions are stabilized by the addition of at least one alcohol.

Embodiments of the present invention relate to an organic peroxide composition comprising, consisting essentially of, or consisting of:
  at least one organic peroxide (e.g., tert-butyl hydroperoxide),
  at least one dye (e.g., an FD&C dye), and
  at least one alcohol (e.g., propylene glycol).

According to particular embodiments, the organic peroxide composition is more color stable than an organic peroxide composition that does not include any alcohols.

Embodiments of the present invention also relate to a method for making an organic peroxide composition, said method comprising, consisting essentially of, or consisting of combining at least one organic peroxide (e.g., tert-butyl hydroperoxide), at least one dye (e.g., an FD&C dye), and at least one alcohol (e.g., propylene glycol).

DETAILED DESCRIPTION

As used herein, "viscosity" has its ordinary meaning: a measure of the internal resistance of a fluid (or a measure of fluid friction). A fluid with a higher viscosity is "thicker" than a fluid with a lower viscosity. Appropriate viscosities of the aqueous treatment fluid during fracturing and recovery of the aqueous treatment fluid are readily ascertainable by one skilled in the art.

As used herein, "room temperature" refers to about 20° C. to about 30° C. (about 68° F. to about 86° F.), more preferably about 25° C. (about 77° F.).

As used herein, "completely color stable" means that the color of an organic peroxide composition does not visibly change to the naked eye over a specified period of time (e.g., over 1 month or 3 months). "Substantially color stable" means that the color of an organic peroxide composition changes slightly to the naked eye over a specified period of time (e.g., over 1 month or 3 months), i.e., the color slightly changes or slightly fades. Color may be more quantitatively determined by acquiring optical spectra of the solutions and then calculating the transmitted intensity (e.g. percent transmission) of light at one or more wavelengths, or by calculating color and lightness parameters well-known in the art (e.g., CIELAB 1976 color space parameters $L^*$, $a^*$, $b^*$, and/or $E^*$).

As used herein, unless specified otherwise, the values of the constituents or components of the compositions are expressed in weight percent or percent by weight of each ingredient in the composition.

According to particular embodiments, the applicants have added colored dyes to organic peroxide compositions to make them more easily identifiable (e.g., to differentiate them from other commercially available peroxide compositions). The addition of at least one colored dye enables users to visibly ascertain the presence of the peroxide composition when it is combined with other components. The applicants have also surprisingly discovered that the addition of at least one alcohol to the colored organic peroxide compositions enhances the color stability of the compositions.

In accordance with particular embodiments, the colored organic peroxide composition of the present invention preferably exhibits one or more of the following features:

(1) According to particular embodiments, the colored organic peroxide composition of the present invention exhibits no visible precipitation of solids (as observed by the naked eye). For example, the colored organic peroxide composition exhibits no visible precipitation of solids after at least one month, at least three months, at least six months, at least nine months, or at least twelve months following preparation of the composition.

(2) According to particular embodiments, the organic peroxide(s) included in the composition of the present invention remain stable and do not exhibit substantial decomposition over time. For example, the peroxide(s) exhibit less decomposition after a period of time compared to an organic peroxide composition that is identical except that it does not include one or more dyes.

(3) According to particular embodiments, the organic peroxide composition of the present invention exhibits a high level of color stability, such that the color remains the same, or substantially the same, over a period of time. For example, the organic peroxide composition may exhibit a change in color that is less than 5%, less than 10%, less than 15%, less than 20%, less than 25%, less than 30%, less than 35%, less than 35%, or less than 40% over a period of at least one month, at least three months, at least six months, at least nine months, or at least twelve months. This color change is preferably measured in accordance with the following spectrophotometric technique. Quantitative measurements of color retention versus time and temperature can be conducted by using a spectrometer made by Perkin Elmer, UV/VIS Lambda 950. Samples of liquid colored materials are placed in a glass cuvette. An empty, blank cuvette is also placed in the reference chamber to cancel out the effect of the glass in the % transmission measurements. At this point % light transmission of the colored solution is measured using wavelengths from 300 nm to 800 nm. Color coordinates are calculated from these transmission spectra using ASTM method E 308-01. The spectral tristimulus values used in these calculations are the CIE 1964 (10°) observer values. The illuminant used is a $D_{65}$ illuminant, and the color values are computed in the L*a*b* color scale against a standard D65 illuminant light % transmission vs wavelength spectra which represents essentially natural daylight. CIE Standard Illuminant D65 is a commonly used standard illuminant defined by the International Commission on Illumination. D65 corresponds roughly to a midday sun in Western Europe/Northern Europe, hence it is also called a natural daylight illuminant. The resulting raw data values of % transmission values versus wavelength in nanometers (nm) are then used to calculate the CIELAB 1976 color space parameters of L*, a* and b* and/or ΔE. It is also possible to simply plot the % transmission values versus wavelength. Liquid chromatography or titration could also be used to monitor the peroxide or active oxygen levels in the solutions over time.

One aspect of the present invention relates to an organic peroxide composition comprising, consisting essentially of, or consisting of at least one organic peroxide, at least one dye, and at least one alcohol. According to particular embodiments, the organic peroxide composition is completely color stable or substantially color stable at one or more temperatures (e.g., 35° C., 43° C., etc.) over at least one week, at least one month, at least two months, at least three months, at least four months, at least five months, or at least six months. According to preferred embodiments, the organic peroxide composition is completely color stable at one or more temperatures (e.g., 35° C., 43° C., etc.) over at least one week, at least one month, at least two months, at least three months, at least four months, at least five months, or at least six months.

The peroxide(s) that may be included in the composition are not particularly limited. The peroxide(s) may be a hydrogen peroxide, inorganic peroxide and/or organic peroxide. In one aspect of the invention, the peroxide is a room temperature stable organic peroxide (i.e., an organic peroxide which does not exhibit significant degradation or decomposition when stored at 25° C. in the absence of substances other than inert solvents). In another aspect, the peroxide is water soluble. The peroxide may have a water solubility greater than 1 g/100 g water at room temperature and pressure. For example, the peroxide may have a water solubility between 3 g/100 g water and 18 g/100 g water, or between 5 g/100 g water and 18 g/100 g water, or between 5 g/100 g water and 10 g/100 g water, or between 3 g/100 g water and 10 g/100 g water, or between 3 g/100 g water and 5 g/100 g water, at room temperature and pressure. The solubility can be measured by using an iodometric titration such as that described by Arthur Vogel in Vogel's Textbook of Quantitative Chemical Analysis, 5th ed., § 10.110, 384-87, Longman Scientific & Technical 1989. The peroxide may be both water soluble and stable at room temperature.

According to particular embodiments, the organic peroxide composition includes between 0.1 to 20%, preferably between 0.1 to 15%, and more preferably 1% and 10% organic peroxide in water. For example, the organic peroxide composition may include between 2% and 10% organic peroxide, or between 2% and 8% organic peroxide, or between 3% and 8% organic peroxide, or between 4% and 8% organic peroxide, or between 4% and 7% organic peroxide, or about 5% organic peroxide in water.

Suitable peroxides include, for example, diacyl peroxides, peroxyesters, monoperoxycarbonates, peroxyketals, hydroperoxides (including alkyl hydroperoxides and aryl hydroperoxides), peroxydicarbonates, ketone peroxides, endoperoxides, and dialkyl peroxides. Combinations of different peroxides, including combinations of different organic peroxides, may be utilized.

Suitable peroxyesters may include, without limitation: di-tert-butyl diperoxyphthalate; di-tert-amyl diperoxyphthalate; tert-butyl peroxybenzoate; tert-amyl peroxybenzoate; tert-butyl peroxyacetate; tert-amyl peroxyacetate; 2,5-di (benzoylperoxy)-2,5-dimethylhexane; tert-butyl peroxymaleate; tert-amyl peroxymaleate; tert-butyl peroxy-2-ethylhexanoate; tert-butyl peroxyisobutyrate; tert-amyl peroxyisobutyrate; di(tert-butylperoxy)fumarate; tert-butyl peroxy(2-ethylbutyrate); tert-butyl peroxy-2-ethylhexanoate; tert-amyl peroxy-2-ethylhexanoate; 2,5-di(2-ethylhexanoylperoxy)-2,5-dimethylhexane; t-butyl peroxy 3,5,5-trimethylhexanoate; t-amyl peroxy 3,5,5-trimethylhexanoate; 1,1-dimethyl-3-hydroxy-butylperoxy-2-ethylhexanoate; tert-butylperoxy-3-carboxypropionate; tert-amylperoxy-3-carboxypropionate; 3-hydroxy-1,1-dimethylbutyl 2-ethyl-peroxyhexanoate; and combinations thereof.

Suitable monoperoxycarbonates may include, for example: OO-tert-butyl-O-(isopropyl) monoperoxycarbonate; OO-tert-amyl-O-(isopropyl)monoperoxycarbonate; OO-tert-butyl-O-(2-ethylhexyl)monoperoxycarbonate; OO-tert-amyl-O-(2-ethylhexyl)monoperoxycarbonate; polyether poly(OO-tert-butyl monoperoxycarbonate); OO-t-butyl-O-polycaprolactone monoperoxy carbonate; 2,5-dimethyl-2,5-bis(isopropoxycarbonyl-peroxy)hexane; 2,5-dimethyl-2,5-bis(isopropoxycarbonyl-peroxy)hexyne-3; and combinations thereof.

Suitable peroxyketals may include, for example: 1,1-di (tert-butylperoxy)-3,3,5-trimethylcyclohexane; 1-tert-amylperoxy-1-methoxy cyclohexane; 1-tert-butylperoxy-1-methoxy cyclohexane; 1,1-di(tert-butylperoxy)cyclohexane; 1,1-di(tert-amylperoxy)cyclohexane; n-butyl-4,4-di(tert-butylperoxy)valerate; 4,4-bis(tert-butylperoxy)valeric acid; ethyl-3,3-di(tert-amylperoxy)butanoate; ethyl-3,3-di(tert-butylperoxy)butanoate; ethyl-3,3-di(tert-butylperoxy)butyrate; 2,2-di(tert-butylperoxy)butane; 2,2-di(tert-amylperoxy)butane; 2,2-di(tert-butylperoxy)propane; 2,2-di(tert-amylperoxy)propane; 2,2-di(tert-butylperoxy)4-methylpentane; 2,2-bis(4,4-di[tert-amylperoxy]cyclohexyl) propane; and combinations thereof.

Suitable diacyl peroxides may include, for example: dide-canoyl peroxide; dilauroyl peroxide; dibenzoyl peroxide; di(methyl benzoyl)peroxide; 2,4-dichlorobenzoyl peroxide; and combinations thereof.

Suitable ketone peroxides may include, for example: 2,4-pentanedione peroxide; methyl ethyl ketone peroxide; methyl isobutyl ketone peroxide; and mixtures thereof.

Suitable hydroperoxides may include, for example: 2,5-dihydroperoxy-2,5-dimethylhexane; cumene hydroperoxide; t-butyl hydroperoxide; t-amyl hydroperoxide; t-octyl hydroperoxide; hydrogen peroxide ($H_2O_2$); 1,1,3,3-tetramethylbutyl hydroperoxide; para-methane hydroperoxide; diisopropylbenzene monohydroperoxide; diisopropylbenzene dihydroperoxide; and combinations thereof.

Suitable peroxydicarbonates may include, for example: di(4-tert-butylcyclohexyl)peroxydicarbonate; di(cyclohexyl)peroxydicarbonate; di(2-phenoxyethyl)peroxydicarbonate; dimyristyl peroxydicarbonate; dicetyl peroxydicarbonate; and combinations thereof.

Suitable dialkyl peroxides may include, for example: dicumyl peroxide; isopropylcumyl cumyl peroxide; isopropylcumyl cumyl peroxide; m/p-di-tert-butylperoxydiisopropylbenzene (a,a'-bis(tert-butylperoxy)diisopropylbenzene); tert-butylperoxyisopropylbenzene (tert-butyl cumyl peroxide); m-isopropylolcumyl t-butyl peroxide (tert-butyl 3-isopropylolcumylperoxide); tert-butyl-3-isopropenyl-cumyl peroxide (m-isopropenylcumyl tert-butyl peroxide); tert-butyl-4-isopropenylcumyl peroxide; tert-butyl-3-isopropylcumyl peroxide; m/p-acetylcumyl t-butyl peroxide; 2,4-diallyloxy-6-tert-butylperoxide-1,3,5-triazine; 3,3,5,7,7-pentamethyl-1,2,4-trioxepane (e.g., TRIGONOX® 311); 3,6,9-triethyl-3,6,9-trimethyl-1,4,7-triperoxonane (e.g., TRIGONOX® 301); di-tert-butyl peroxide; 2-methoxy-2-tert-butylperoxy propane; di-tert-amyl peroxide; 2,5-dimethyl-2,5-di(tert-butylperoxy)hexane; 2,5-dimethyl-2,5-di(tert-amylperoxy)hexane; 2,5-dimethyl-2,5-di(tert-butylperoxy)hexyne-3; 1,3-dimethyl-3(t-butylperoxy)butyl N[1-{3-(1-methylethenyl)phenyl}1-methylethyl]carbamate; 4-(tert-amylperoxy)-4-methyl-2-pentanol; 4-(tert-butylperoxy)-4-methyl-2-pentanol; 3-(t-butylperoxy)-3-methyl-2-pentanone; 4-methyl-4-(tert-butylperoxy)-2-pentanone (e.g., LUPEROX® 120); 1-methoxy-1-tert-butylperoxy cyclohexane; 2,4,6-tri(tert-butylperoxy)triazine; tert-butyl-1,1,3,3-tetramethylbutyl peroxide; 3-methyl-3-(tert-butylperoxy)-2-butanol (e.g., LUPEROX® 240); 3-methyl-3(tert-amylperoxy)-2-butanol (e.g., LUPEROX® 540); and combinations thereof.

According to particular embodiments, the peroxide in the organic peroxide composition of the present invention comprises, consists essentially of, or consists of tert-butyl hydroperoxide. According to these embodiments, the organic peroxide composition may comprise, consist essentially of, or consist of water and tert-butyl hydroperoxide.

In some preferred embodiments, the at least one organic peroxide is selected from the group considering of 2,5-dimethyl-2,5-di(t-butylperoxy)hexane; cumene hydroperoxide; 1,1-di(t-butylperoxy)-3,3,5-trimethylcyclohexane; diisopropylbenzene hydroperoxide; di-t-butyl peroxide; di-t-amyl peroxide; 2,5-dimethyl-2,5-di(t-butylperoxy)hexyne-3; t-butyl cumyl peroxide; t-butyl perbenzoate; and OO-(t-butyl)-O-(2-ethylhexyl)monoperoxycarbonate and mixtures thereof.

The dye(s) that are included in the organic peroxide compositions of the present invention are preferably stable (i.e., they do not exhibit a substantial color change, as determined by a visual inspection of the composition) over a wide range of temperatures for a prolonged period time. For example, the dye(s) are preferably stable in the compositions between temperatures of −30° F. and 90° F., or between −10° F. and 90° F. The dye(s) are also preferably stable in the compositions for at least three months, more preferably at least four months or five months, most preferably at least six months. It is also preferred that the dye(s) are compatible with the components of the organic peroxide composition so that they do not decrease the efficacy of the composition.

The dye(s) that are included in the organic peroxide compositions of the present invention are preferably organic, and are also preferably metal-free (e.g., they do not include iron). For example, the dyes preferably do not include any of the dyes listed in U.S. Pat. No. 3,181,991 (e.g., red iron oxide, black iron oxide, yellow iron oxide, chrome orange, phthalocyanine and ferric ferrocyanide). The dyes also preferably do not include anthraquinone derivatives or pyrazalone derivatives.

According to particular embodiments, the dyes are D&C dyes (dyes that have been approved by the U.S. Food and Drug Administration for use in drugs and cosmetics), more preferably FD&C dyes (dyes that have been approved by the U.S. Food and Drug Administration for use in food, drugs and cosmetics).

Non-limiting examples of suitable dyes that may be used in organic peroxide compositions of the present invention include FD&C Blue #1, FD&C Red #3, FD&C Red #40, FD&C Yellow #6, Purple Shade, Grape Shade, Blue Liquid and Purple Liquid. The dyes are commercially available; for example, from ROHA or Abbey Color.

As used herein, FD&C Blue #1 is ethyl-[4-[[4-[ethyl-[3-sulfophenyl)methyl]amino]phenyl]-(2-sulfophenyl)methylidene]-1-cyclohexa-2,5-dienylidene]-[3-sulfophenyl) methyl]azanium, as shown below:

FD&C Blue #1 is also known in the art as "Brilliant Blue FCF," and is preferably in powder form.

As used herein, FD&C Red #3 is 2-(6-hydroxy-2,4,5,7-tetraiodo-3-oxo-xanthen-9-yl)benzoic acid, as shown below:

FD&C Red #3 is also known in the art as "erythrosine," and is preferably in powder form.

As used herein, FD&C Red #40 is disodium 6-hydroxy-5-((2-methoxy-5-methyl-4-sulfophenyl)azo)-2-napthalenesulfonate, as shown below:

FD&C Red #40 is also known in the art as "Allura Red," and is preferably in powder form.

As used herein, FD&C Yellow #6 is disodium 6-hydroxy-5-[(4-sulfophenyl)azo]-2-naphthalenesulfonate, as shown below:

FD&C Yellow #6 is also known in the art as "Sunset Yellow," and is preferably in powder form.

According to particular embodiments, the dye(s) included in organic peroxide compositions of the present invention are selected from the group consisting of FD&C Blue #1, FD&C Red #3, FD&C Red #40, FD&C Yellow #6 and mixtures thereof. According to particular embodiments, the dye(s) included in organic peroxide compositions of the present invention optionally include one or more preservatives (e.g., sodium benzoate and/or citric acid).

As used herein, "Purple Shade" comprises, consists essentially of, or consists of both FD&C Blue #1 and FD&C Red #3. "Purple Shade" is preferably in powder form.

"Grape Shade" comprises, consists essentially of, or consists of both FD&C Blue #1 and FD&C Red #40 (for example, about 75 wt % Red #40 and about 25 wt % Blue #1). "Grape Shade" is preferably in powder form.

"Blue Liquid" comprises, consists essentially of, or consists of FD&C Blue #1 and at least one preservative (e.g., sodium benzoate and/or citric acid) in water. According to particular embodiments, "Blue Liquid" comprises, consists essentially of, or consists of FD&C Blue #1, sodium benzoate and citric acid in water.

"Purple Liquid" comprises, consists essentially of, or consists of FD&C Blue #1, FD&C Red #40 and at least one preservative (e.g., sodium benzoate and/or citric acid) in water. According to particular embodiments, "Purple Liquid" comprises, consists essentially of, or consists of FD&C Blue #1, FD&C Red #40, sodium benzoate and citric acid in water.

According to particular embodiments, the dye(s) in the organic peroxide composition comprise, consist essentially of, or consist of the dyes selected from the group consisting of FD&C Blue #1, FD&C Red #40, and a combination thereof.

According to particular embodiments, the dye(s) contain one or more sulfonate functional groups, wherein the sulfonate functional group(s) may be attached to an aromatic ring.

According to alternative embodiments, the dye(s) are water-soluble anionic dyes.

According to particular embodiments, the organic peroxide composition includes the at least one dye in an amount between about 0.001 wt % and about 2 wt %, or between about 0.005 wt % and about 2 wt %, or between about 0.01 wt % and about 2 wt %, or between about 0.1 wt % and about 2 wt %, or between about 0.5 wt % and about 2 wt %, or between about 0.005 wt % and about 1 wt %, or between about 0.01 wt % and about 1 wt %, or between about 0.1 wt % and about 1 wt %, or between about 0.5 wt % and about 1 wt %, or between about 0.001 wt % and about 0.1 wt %, or between about 0.01 wt % and about 0.1 wt %, or between about 0.01 wt % and about 0.05 wt %, or between about 0.02 wt % and about 0.05 wt %, or between about 0.02 wt % and about 0.04 wt %, or between about 0.03 wt % and about 0.05 wt %, or between about 0.03 wt % and about 0.04 wt %.

Suitable alcohols for use in the organic peroxide compositions of the present invention may include, for example, glycols and/or butyl alcohols and/or triols (e.g., glycerol) and/or monosaccharides and/or disaccharides. In one aspect of the invention, the alcohol is water soluble. The alcohol may be a mono-alcohol (containing one hydroxyl group per molecule) and/or a triol (e.g., glycerol) and/or a polyalcohol (containing two or more hydroxyl groups per molecule), such as a glycol. According to particular embodiments, the organic peroxide composition does not include ethylene glycol.

According to particular embodiments, the organic peroxide composition includes between 0.01% and 5% alcohol(s), or between 0.1% and 5% alcohol(s), or between 0.1% and 3% alcohol(s), or between 0.5% and 5% alcohol(s), or between 0.5% and 3% alcohol(s), or between 0.5% and 2% alcohol(s), or between 0.5% and 1.5% alcohol(s), or between 0.5% and 1% alcohol(s), or about 1% alcohol(s), or about 0.75% alcohol(s), or about 0.95% alcohol(s) in water. According to further embodiments, the organic peroxide composition includes between 5% and 30% alcohol(s) relative to the peroxide(s), or between 10% and 30%, or between 10% and 25%, or between 15% and 25%, or between 15% and 20%, or between 20% and 30%, or between 20% and 25% relative to the peroxide(s).

According to particular embodiments, the alcohol(s) included in the organic peroxide composition are selected from the group consisting of polyols, glycols, butyl alcohols, triols, monosaccharides, disaccharides and a combination thereof. Alternatively, the alcohol(s) comprise, consist essentially of, or consist of at least one alcohol selected from the group consisting of propylene glycol, butyl alcohol(s) (e.g., t-butyl alcohol), and glycerin. According to these embodiments, the organic peroxide composition may comprise, consist essentially of, or consist of water; at least one peroxide (e.g., tert-butyl hydroperoxide); and at least one alcohol selected from the group consisting of propylene glycol, a butyl alcohol (e.g., tert-butyl alcohol), glycerin, and a combination thereof.

Embodiments of the organic peroxide compositions of the present invention may include one or more optional additives. Non-limiting examples of the one or more optional additives can be selected from the group consisting of: one or more pH adjusters, preservatives, surfactants, stabilizers (e.g. dibutyl maleate), inhibitors and/or antioxidants (e.g., butylated hydroxytoluene or butylated hydroxyanisole or Vitamin E), benzoic acid or a salt thereof, citric acid or a salt thereof, one or more nitroxide-containing compounds, one or more quinone-containing compounds, one or more coagents, and/or one or more inert fillers.

According to particular embodiments, the organic peroxide composition comprises, consists essentially of, or consists of:
water (e.g., in an amount of about 85% to about 98%, about 88% to about 95% or about 92% to about 96%),
at least one organic peroxide (e.g., in an amount of about 1% to about 10%),
at least one alcohol (e.g., in an amount of about 0.01 to about 5%),
at least one dye (e.g., in an amount about 0.001 wt % and about 2 wt %), and
one or more optional additives.

According to particular embodiments, the organic peroxide composition comprises, consists essentially of, or consists of:
water,
about 5 wt % tert-butyl hydroperoxide,
about 0.04 wt % dye selected from the group consisting of FD&C Blue #1 and FD&C Red #40,
about 0.75 wt % propylene glycol, and
one or more optional additives.

According to particular embodiments, the organic peroxide composition is not in the form of an oil-in-water or water-in-oil emulsion, i.e., the organic peroxide composition is in a non-emulsified form. For example, in certain embodiments the organic peroxide composition is not a microemulsion or nanoemulsion.

According to particular embodiments, a method of making an organic peroxide composition of the present invention comprises, consists essentially of, or consists of combining the organic peroxide(s), the at least one dye(s), and the at least one alcohol(s) in any order. Mixing may be conducted at ambient temperature, or at temperatures above or below ambient; the preferred temperature will depend on the temperature stability of the peroxide.

The end uses of the organic peroxide compositions of the present invention are not particularly limited. For example, the organic peroxide compositions may be used in the manufacture of polymers; for example, by emulsion, or inverse emulsion or solution, or bulk polymerizations (e.g., polyethylene, polystyrene, polyvinyl chloride, polyacrylates), water-soluble polymers (e.g., polyacrylamides, which can be used, for example, as flocculating agents or lubricants), crosslinked saturated elastomers (including but not limited to silicon rubber without unsaturation (Q), methylpolysiloxane (MQ), phenyl-methyl-polysiloxane (PMQ), poly(ethylene-vinyl acetate) (EVA), high-density polyethylene (HDPE), low-density polyethylene (LDPE), chlorinated poly(ethylene) (CPE), poly(ethylene propylene) (EPM), fluoroelastomers (FKM, FFKM) (e.g., Viton® and Dyneon®), and combinations thereof), crosslinked unsaturated elastomers (including but not limited to ethylene-propylene-diene terpolymer (EPDM), vinyl silicone rubber (VMQ), fluorosilicone (FVMQ), nitrile rubber (NBR), acrylonitrile-butadiene-styrene (ABS), styrene butadiene rubber (SBR), styrene-butadiene-styrene block copolymers (SBS) polybutadiene rubber (BR), styrene-isoprene-styrene block copolymers (SIS), partially hydrogenated acrylonitrile butadiene (HNBR), natural rubber (NR), synthetic polyisoprene rubber (IR), neoprene rubber (CR), polychloropropene, bromobutyl rubber (BIIR), chlorobutyl rubber, and combinations thereof), rheology-modified polypropylene, thermoplastic vulcanates, polymers in which with functional groups are grafted using reactive extrusion, acrylic impact modifiers, and crosslinking polyester resins.

In some preferred embodiments, use of the colored peroxides disclosed herein provides color to the final product, including composites (such as bathtubs, boat hulls, structural adhesives, etc.). In other embodiments, the use of colored peroxides provides visual confirmation that the proper peroxide was used in the appropriate concentration.

Another embodiment of the invention relates to an article of manufacture comprising a colored organic peroxide composition of the present invention. For example, the colored peroxide compositions disclosed herein can be used in the manufacture of packaging (including food packaging and for computer hardware), dispensing bottles and tubes, flexible containers and tubing for healthcare, lids and caps and closures, shrink film for books and bundling and pallets, plastic liners and bags, trays and general purpose containers, surface protection film and lamination film, corrosion resistant work surfaces, flooring, playground slides, garage doors, helmets, canoes, gasoline cans and tanks, boat hulls, shower stalls, bath tubs, golf balls, shoe soles, electrical wires and cables, hoses and gaskets and belts, pipes and siding, plastic cutlery and dinnerware, CD "jewel" cases, smoke detector housings, molded laboratory equipment such as Petri dishes and other laboratory containers such as test tubes and microplates, building insulation materials (including molded sheets and insulating concrete forms and structurally insulated panel building systems), non-weight-bearing architectural structures such as ornamental pillars, packing material (e.g., "peanuts"), rigid polystyrene panels (e.g., "bead-board"), plastic toys and casings, structural adhesives, foods (for example, cheese and whey proteins and edible oils and beverages such as beer and other alcoholic beverages), and pharmaceutical and cosmetic products.

The embodiments described herein are intended to be exemplary of the invention and not limitations thereof. One skilled in the art will appreciate that modifications to the embodiments and examples of the present disclosure may be made without departing from the scope of the present disclosure.

The embodiments of the invention are described above using the term "comprising" and variations thereof. However, it is the intent of the inventors that the term "comprising" may be substituted in any of the embodiments described herein with "consisting of" and "consisting essentially of" without departing from the scope of the invention. Unless specified otherwise, all values provided herein include up to and including the starting points and end points given.

The following examples further illustrate embodiments of the invention and are to be construed as illustrative and not in limitation thereof.

EXAMPLES

Example 1

Organic peroxide compositions were tested with varying amounts of FD&C Blue #1, FD&C Red #40, and propylene glycol. The organic peroxide included in each sample was 5% tert-butyl hydroperoxide (TBH) in water. Alcohol was then added to the aqueous organic peroxide solutions, and the resultant solutions mixed at ambient temperature; dye was then added to the mixture and the solution mixed at ambient temperature. Samples of the colored peroxide solutions were placed in temperature controlled ovens, and were removed from the ovens and visually inspected and/or analyzed by UV-Vis spectroscopy at regular intervals. Liquid chromatography or titration could also be used to monitor the peroxide or active oxygen levels in the solutions over time Sample #1 contained 5% TBH, 0.04% FD&C Blue #1, and 1.0% propylene glycol in water. After 5 months at 50° C., Sample #1 exhibited no color change visible to the eye (i.e., it was completely color stable).

Sample #2 contained 5% TBH, 0.04% FD&C Blue #1, and 0.5% propylene glycol in water. After 5 months at 50° C., Sample #2 exhibited only a slight color change from blue to purple (i.e., it was substantially color stable).

Sample #3 contained 5% TBH, 0.02% FD&C Blue #1, and 0.5% propylene glycol in water. Sample #4 contained 5% TBH, 0.02% FD&C Red #40, and 0.5% propylene glycol in water. Both Samples #3 and #4 exhibited a slight decrease in color after one month at 35° C. (i.e., they were substantially color stable), and most of the color faded after one month at 43° C.

Sample #5 contained 5% TBH, 0.04% FD&C Blue #1, and 0.75% propylene glycol in water. Sample #6 contained 5% TBH, 0.04% FD&C Red #40, and 0.75% propylene glycol in water. Both Samples #5 and #6 exhibited strong color stability after three months at both 35° C. and 43.3° C. (no changes in color were observed—they were completely color stable). Based on these results, the organic peroxide compositions that exhibited the most color stability over time were those that included a 0.04% dye loading and 0.75% propylene glycol.

Example 2

Quantitative spectrometer measurements were made on the novel colored organic peroxides of the invention which were subjected to time and temperature studies. Measurements of color retention versus time and temperature were conducted using a spectrometer made by Perkin Elmer, UV/VIS Lambda 950. Samples of liquid colored materials were placed in a glass cuvette. An empty, blank cuvette was also placed in the reference chamber to cancel out the effect of the glass in the % transmission measurements. Percent light transmission of the colored peroxide solution was measured using wavelengths from 300 nm to 800 nm. Color coordinates are calculated from these transmission spectra using ASTM method E 308-01. The raw data of % transmission values versus wavelength in nanometers (nm) was used to calculate the CIELAB 1976 color space parameters of L*, a* and b*. The b* values track the change in yellow and blue color. The a* values track any change in red and green color. Graphs of these color space parameters values allow one to study the change or lack of change in color versus time and temperature.

A blue colored peroxide solution was formed using water, t-butyl hydroperoxide, glycerin and FD&C Blue #1. The final composition consisted of 5 wt % t-butyl hydroperoxide, 0.75 wt % glycerin and 0.04 wt % FD&C Blue #1 with the remainder being water. Samples were stored in sealed glass containers immersed in thermostatically controlled water baths set to 35 C and 43.3 C to simulate warehouse storage conditions a potential user of an ambient stable peroxide might experience. Samples were measured on the Perkin Elmer, UV/VIS Lambda 950 versus time in months.

Figure 1:
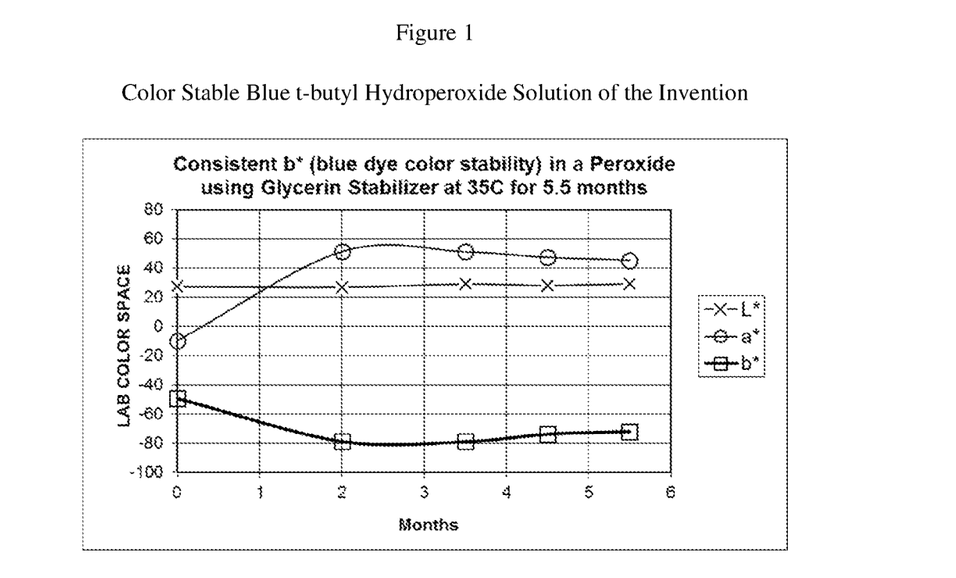
FIG. 1 is of the invention and pertains to Example 1.
Figure 2:
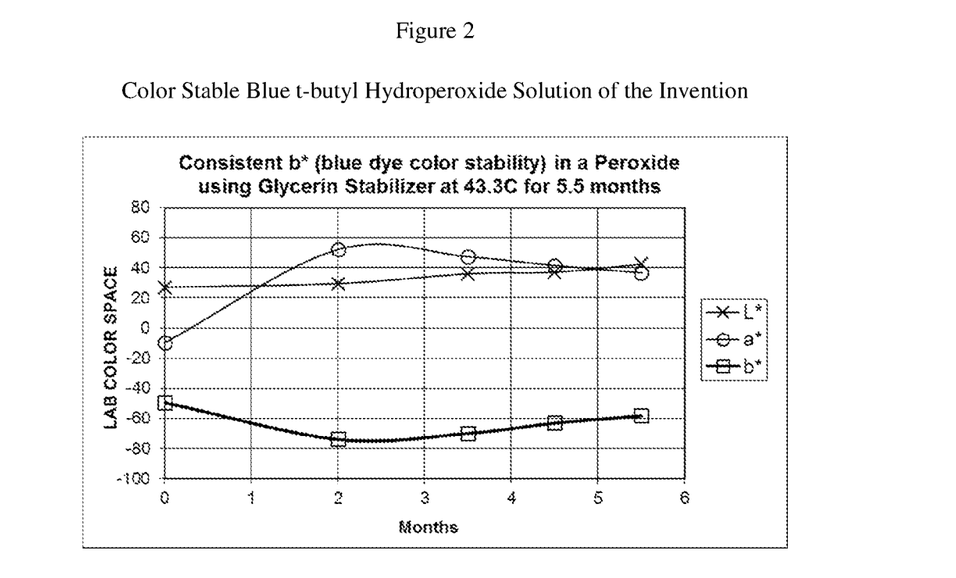
FIG. 2 is of the invention and pertains to Example 1.

FIGS. 1 and 2 show that unexpectedly no substantial change in b* was observed over 5.5 months of storage at either 35 C or 43.3 C when using the novel glycerin stabilizer of the invention. Thus, the blue color was stable in the peroxide solution and did not fade. The negative numbered b* spectroscopic values track the change blue color. The more negative the darker the blue color.

Peroxide solutions generally are well known to efficiently bleach out or fade various colored species. The spectroscopic data is much more sensitive in detecting color change versus the human eye. The quantitative data provided in FIGS. 1 and 2 show substantially no change in blue color compared to the initial zero month data point on the graphs based upon the b* values, wherein negative numbered b* values track the change blue color.

A useful feature for the novel glycerin stabilizer for colored peroxide solutions is that it is considered to be GRAS; "Generally Regarded As Safe". So, color stable peroxide formulations for organic peroxides that comply with FDA indirect food contact applications and further comprising FD&C Blue #1 dye may be formulated.

Figure 3:
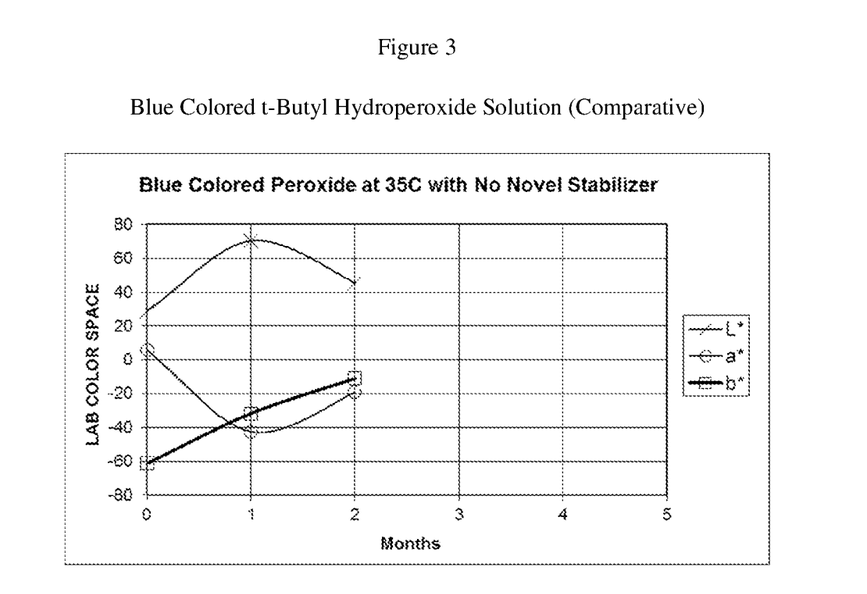
FIG. 3 is a comparative.
Figure 4:
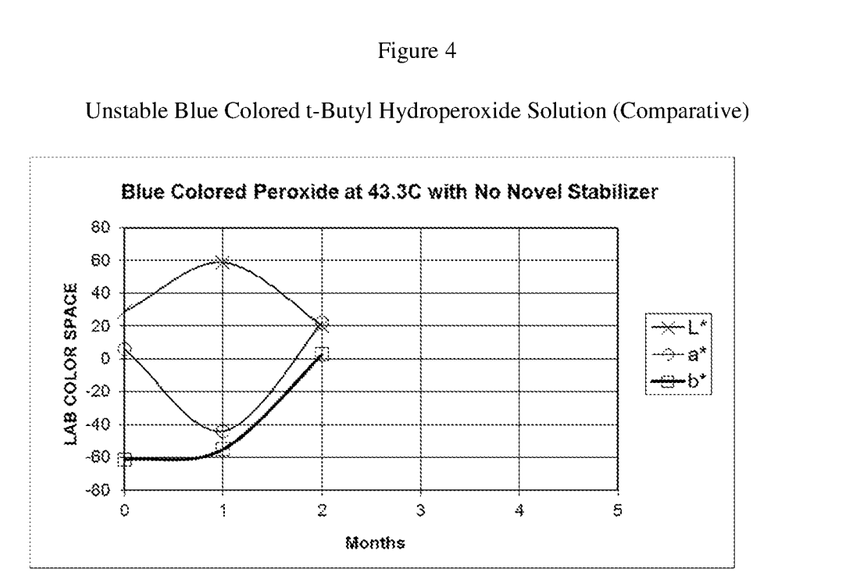
FIG. 4 is a comparative.

In FIGS. 3 and 4, it is shown that without the use of glycerin, propylene glycol or one of the other hydroxyl functional stabilizers described herein, the blue colored peroxide solution comprising 5 wt % t-butyl hydroperoxide and 0.04 wt % FD&C Blue #1 was not color stable. From the data in FIG. 3 at 35 C, the b* spectra data shows a linear decrease in blue color intensity that began from day one. The blue colored solution continued to fade to the point where b* was now zero at two months, indicating complete loss of all blue color.

Example 3

Referring to FIGS. 5 through 8, two colored peroxide solutions were treated in accordance with the invention; one red colored and one blue colored.

A blue colored peroxide solution using water, t-butyl hydroperoxide, propylene glycol and FD&C Blue #1 was formulated. The final composition consisted of 5 wt % t-butyl hydroperoxide, 0.75 wt % propylene glycol and 0.04 wt % FD&C Blue #1 with water as the remainder.

A red colored peroxide solution using water, t-butyl hydroperoxide, propylene glycol and FD&C Red #40 was formulated. The final composition consisted of 5 wt % t-butyl hydroperoxide, 0.75 wt % propylene glycol and 0.04 wt % FD&C Red #40 with water as the remainder.

All samples were stored in sealed glass containers immersed in thermostatically controlled water baths set to 35 C and 43.3 C to simulate warehouse storage conditions a potential user of an ambient stable peroxide might experience. Samples were measured on the Perkin Elmer, UV/VIS Lambda 950 versus time in months.

Figure 5:
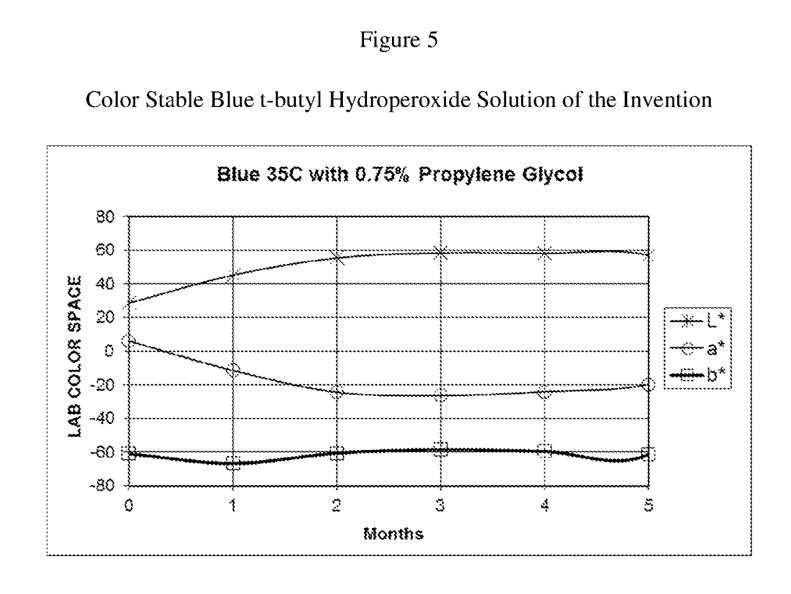
FIG. 5 is of the invention and pertains to Example 3.
Figure 6:
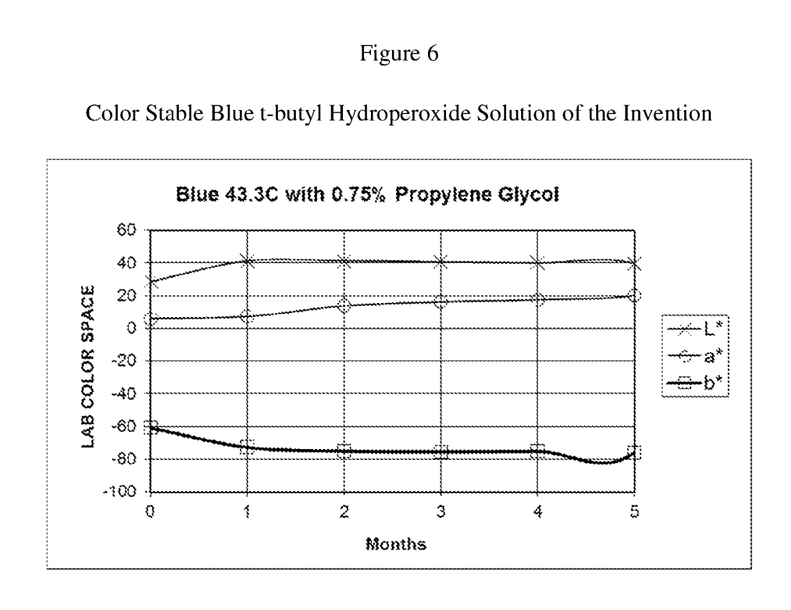
FIG. 6 is of the invention and pertains to Example 3.

Refer to the b* plots provided in FIG. 5 and FIG. 6 for the color analysis of the novel blue peroxide composition prepared according to this invention. The consistent b* values for five months confirms the unexpected color stability of the blue peroxide composition including propylene glycol.

Figure 7:
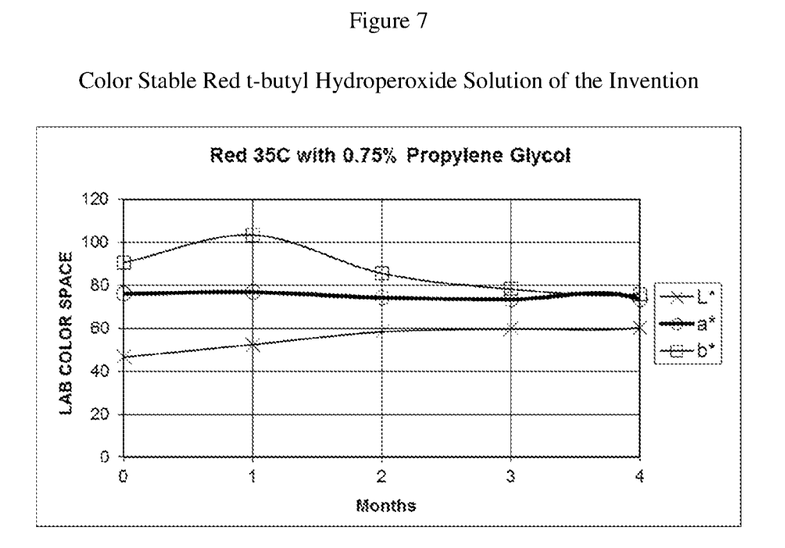
FIG. 7 is of the invention and pertains to Example 3.
Figure 8:
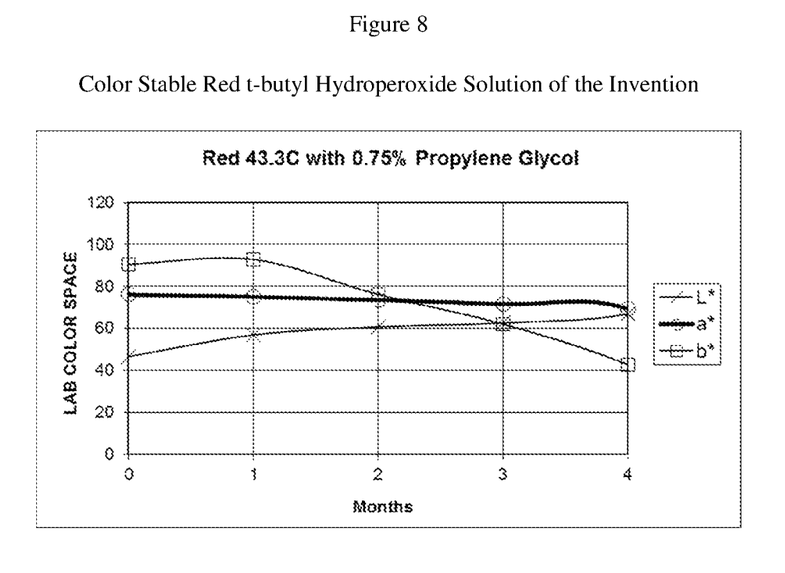
FIG. 8 is of the invention and pertains to Example 3.

Refer to the a* plots provided in FIG. 7 and FIG. 8 for the color analysis of the red peroxide composition of this invention. The consistent a* values for five months confirms the the unexpected color stability of the red peroxide composition. Positive a* spectral values track the intensity of the color red. The consistent a* spectral data shows excellent color retention at 35 C and at 43.3 C for four months.

What is claimed is:

1. A colored organic peroxide composition comprising:
   one or more peroxides selected from the group consisting of organic peroxides,
   at least one organic dye that is metal-free, selected from the group consisting of FD&C Blue #1, FD&C Red #3, FD&C Red #40, FD&C Yellow #6, Purple Shade, Grape Shade, Blue Liquid, Purple Liquid and mixtures thereof,
   at least one alcohol selected from the group consisting of polyols, glycols, butyl alcohols, triols, monosaccharides, disaccharides and a combination thereof;
   whereby the organic peroxide is colored.

2. The colored organic peroxide composition of claim 1, wherein the at least one organic peroxide comprises tert-butyl hydroperoxide.

3. The colored organic peroxide composition of claim 1, wherein the at least one dye is selected from the group consisting of FD&C Blue #1 and FD&C Red #40.

4. The colored organic peroxide composition of claim 1, wherein the at least one alcohol is selected from the group consisting of propylene glycol, tert-butanol, glycerin, and mixtures thereof.

5. The colored organic peroxide composition of claim 1, where the at least one alcohol comprises propylene glycol.

6. The colored organic peroxide composition of claim 1, wherein the at least one alcohol comprises tert-butanol.

7. The organic peroxide composition of claim 1, wherein the at least one alcohol comprises glycerin.

8. The colored organic peroxide composition of claim 1 comprising the at least one peroxide in an amount between about 0.1 wt % and about 10 wt %.

9. The colored organic peroxide composition of claim 1 comprising the at least one dye in an amount between about 0.001 wt % and about 2 wt %.

10. The colored organic peroxide composition of claim 1 comprising the at least one alcohol in an amount between about 0.1 wt % and about 5 wt %.

11. The colored organic peroxide composition of claim 1, wherein the organic peroxide composition is color stable over at least one month at 35° C. exhibiting a change in color that is less than 40%.

12. The colored organic peroxide composition of claim 1, wherein the organic peroxide composition is color stable over at least three months at 35° C. exhibiting a change in color that is less than 40%.

13. The colored organic peroxide composition of claim 1 comprising:
   (i) tert-butyl hydroperoxide,
   (ii) dye selected from the group consisting of FD&C Blue #1 and FD&C Red #40, and
   (iii) propylene glycol.

14. An article of manufacture comprising the colored organic peroxide composition of claim 1, wherein the article of manufacture is selected from the group consisting of packaging material, dispensing bottles, tubes, flexible containers, tubing, lids, caps, closures, shrink film, plastic liners, bags, trays, containers, surface protection film, lamination film, corrosion resistant work surfaces, flooring, playground slides, garage doors, helmets, canoes, gasoline cans and tanks, boat hulls, shower stalls, bath tubs, golf balls, shoe soles, electrical wires and cables, hoses, gaskets, belts, pipes, siding, plastic cutlery, compact disc cases, smoke detector housings, molded laboratory equipment, building insulation materials, pillars, packing material, polystyrene panels, plastic toys, foods, pharmaceutical products and cosmetic products.

15. A method of making the colored organic peroxide composition of claim 1 comprising combining the at least one organic peroxide, the at least one dye, and the at least one alcohol.

* * * * *